US012566859B2

(12) United States Patent       (10) Patent No.:   US 12,566,859 B2

Kancherla et al.               (45) Date of Patent:       Mar. 3, 2026

---

(54) SYSTEMS, METHODS, AND DEVICES FOR EFFICIENT WAKE OPERATIONS HAVING REDUCED BOOT TIMES

(71) Applicant: Cypress Semiconductor Corporation, San Jose, CA (US)

(72) Inventors: Naga Lakshmana Sundeep Kancherla, Bangalore (IN); Suryakant Maharana, Karnataka (IN); Shirish Agrawal, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 96 days.

(21) Appl. No.: 18/437,982

(22) Filed: Feb. 9, 2024

(65) Prior Publication Data

US 2025/0258922 A1     Aug. 14, 2025

(51) Int. Cl.
*G06F 21/57*        (2013.01)
*G06F 21/60*        (2013.01)

(52) U.S. Cl.
CPC .......... *G06F 21/575* (2013.01); *G06F 21/602* (2013.01)

(58) Field of Classification Search
CPC .............................. G06F 21/575; G06F 21/602
See application file for complete search history.

(56) References Cited

U.S. PATENT DOCUMENTS

| | | | | |
|---|---|---|---|---|
| 7,360,073 B1 * | 4/2008 | Billstrom | .............. | G06F 21/575 |
| | | | | 713/168 |
| 9,760,697 B1 * | 9/2017 | Walker | ................ | G06F 21/6245 |
| 2013/0159690 A1 * | 6/2013 | Tsukamoto | ........... | G06F 9/4401 |
| | | | | 713/2 |
| 2013/0227266 A1 * | 8/2013 | Beverly | ................ | G06F 9/4416 |
| | | | | 713/2 |
| 2018/0322269 A1 * | 11/2018 | Arora | ....................... | G06F 21/33 |
| 2019/0116493 A1 * | 4/2019 | Cyril | ..................... | H04W 12/06 |

* cited by examiner

*Primary Examiner* — Zahid Choudhury

(57)                ABSTRACT

Systems, methods, and devices provide efficient wake operations and boot times for electronic devices. Methods include initiating, using one or more processing elements, a boot operation associated with a plurality of power domains, and determining, using the one or more processing elements, a type of the boot operation based, at least in part, on current status information identifying a current status of each of the plurality of power domains. Methods further include determining, using the one or more processing elements, one or more authentication operations based, at least in part, on the type of boot operation and a configuration of the plurality of power domains being booted, performing, using the one or more processing elements, the one or more authentication operations prior to booting the power domain.

20 Claims, 6 Drawing Sheets

SYSTEMS, METHODS, AND DEVICES FOR EFFICIENT WAKE OPERATIONS HAVING REDUCED BOOT TIMES

TECHNICAL FIELD

This disclosure relates to electronic devices, and more specifically, to enhancement of wake operations and boot times associated with such electronic devices.

BACKGROUND

Electronic devices may include various different power domains used to manage power supply and regulation for different components implemented within such power domains. For example, processors may be implemented within a power domain having an associated power supply. Moreover, memory devices may be implemented within the same power domain, or within a different power domain. Powering and depowering of such power domains may be managed during boot operations. For example, during a boot operation, one or more power domains may be powered up. Conventional techniques for powering such power domains within secure electronic devices remain limited because they are inefficient in their usage of computational and hardware resources.

DETAILED DESCRIPTION

Figure 1:
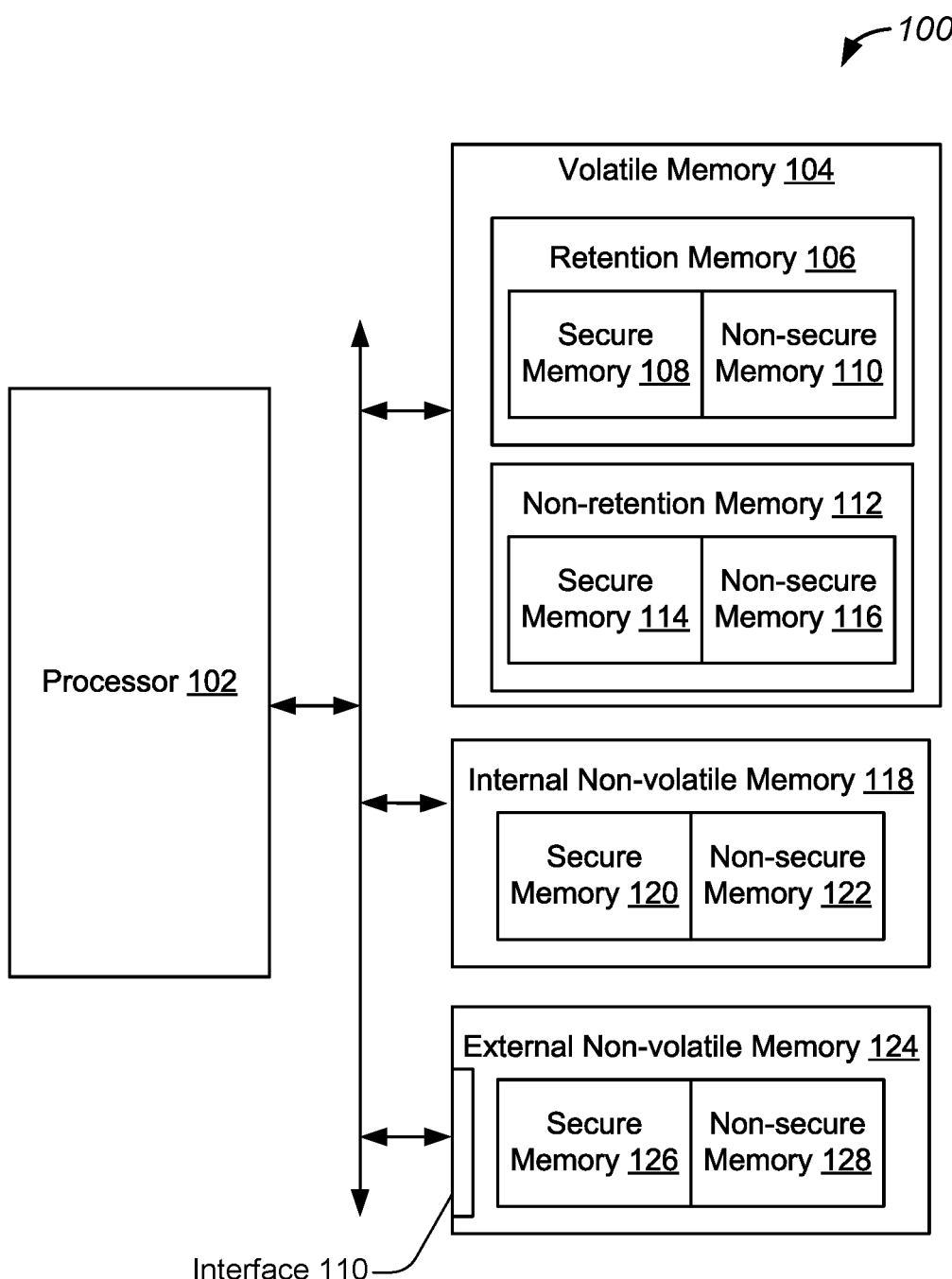
FIG. 1 illustrates an example of a device for boot operations, configured in accordance with some embodiments.

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Electronic systems and devices disclosed herein may be any suitable processing environment that undergoes boot operations as well as depowering/sleep operations. For example, such electronic systems and devices may include wireless communications devices, such as smartphones and Internet of Things (IoT) devices that may be included in a smart home environment. Accordingly, such systems and devices may be low-power devices or other devices where computational resources and power usage requirements are limited.

Moreover, such systems and devices may be secure devices that include secure memory storage locations. More specifically, such secure memory storage locations may be read-only or read-write memory that stores authenticated and optionally encrypted firmware including boot code used during a boot operation. Accordingly, such secure memory may be accessed during boot operations, and may be authenticated each time to ensure the integrity of the data stored within the secure memory. As will be discussed in greater detail below, authentication algorithms defined by one or more authentication standards may be used for such authentication operations. In this way, usage and authentication of the data stored in secure memory may be implemented in accordance with an authentication standard.

In various embodiments, such authentication operations may be asymmetric authentication operations which use an asymmetric authentication algorithm, such as a public/private key pairing. Accordingly, as disclosed herein, asymmetric authentication operations may include authentication operations performed using asymmetric key based cryptographic operations. Such authentication operations are computationally and resource intensive, and often utilize additional processing hardware, such as a hardware accelerator. Accordingly, the use of asymmetric authentication operations results in increased power consumption, hardware usage, and longer processing times for boot operations when a system or device is powered up and/or transitioned from a sleep mode to a wake mode.

Embodiments disclosed herein provide efficient implementation of authentication operations to reduce overall power consumption and processing time associated with boot operations for various power domains. As will be discussed in greater detail below, system status information may be used to determine a type of authentication operation that should be used during a boot operation, and the type of authentication operation may be selected such that a less computationally intensive authentication operation may be selected when appropriate to reduce overall power consumption and processing times associated with such boot operations. More specifically, less computationally intensive authentication operation may be used during warm boot operations thus improving the efficiency of the implementation of such warm boot operations by allowing for the implementation of faster boot operations that are performed over a shorter period of time.

FIG. 1 illustrates an example of a device for boot operations, configured in accordance with some embodiments. Accordingly, a device, such as device 100, may be configured to have different operational modes, such as a wake mode and a sleep mode. As similarly discussed above, device 100 may have electronic components implemented in different power domains that may be powered and unpowered in different operational modes, and such powering and depowering of power domains may be controlled, at least in part, using different boot operations in wake mode transitions. As will be discussed in greater detail below, configuration of authentication operations during boot operations may improve the efficiency of such authentication operations and an overall transition to a wake mode.

Device 100 may be a processing device that includes processor 102 which is configured to perform one or more processing operations for device 100. As similarly discussed above, device 100 may be one of a plurality of different types of devices, such as a wireless device, a smart device, an environmental monitoring or security device, or any other suitable electronic device capable of booting upon power-up and/or transitioning from a sleep mode to a wake mode.

Accordingly, processor 102 may be a host processor implemented within such devices, or may be a processor within a memory controller implemented within such devices.

Device 100 further includes volatile memory 104 which is configured to store one or more data values for processing operations performed by processor 102. In some embodiments, volatile memory 104 is an internal volatile memory included within device 100. Moreover, volatile memory 104 may include retention memory 106 which is configured to remain powered even when device 100 enters a sleep mode. As shown in FIG. 1, retention memory 106 may include a secure portion and a non-secure portion, such as secure memory 108 and non-secure memory 110 respectively. Moreover, volatile memory 104 may additionally include non-retention memory 112 that also includes secure memory 114 and non-secure memory 116. Non-retention memory 112 may be depowered during a sleep mode. Accordingly, processor 102 and a portion of volatile memory 104 not including retention memory 106 may be in a first power domain that is unpowered when device 100 is in a sleep mode. Moreover, retention memory 106 may be in a second power domain that remains powered during such a sleep mode.

As will be discussed in greater detail below, a secure portion of retention memory 106, such as secure memory 108, may be configured to store a temporary and unique security key that may be used in particular boot conditions. In some embodiments, such a temporary key may be generated using a number generator, such as a true random number generator or a pseudo random number generator. For example, when device 100 transitions from a sleep mode to a wake mode, the temporary key may be used, thus avoiding more computationally intensive authentication operations that may otherwise be incurred by secure memory 108 discussed in greater detail below. It will be appreciated that both the first power domain and the second power domain are unpowered when device 100 is turned off and in an unpowered mode.

Device 100 additionally includes internal non-volatile memory 118 which may be configured to include secure memory 120 and non-secure memory 122. Moreover, device 100 may also include external non-volatile memory 124 that may include secure memory 126 and non-secure memory 128. 3 As will be discussed in greater detail below, external non-volatile memory 124 may be configured to store firmware that may be used during boot operations of device 100.

In various embodiments, processor 102 may be coupled to secure memory 126 via interface 110. In one example, secure memory 126 may be an external flash device that is coupled to processor 102 via a memory interface. In this way, one or more data values may be stored in an external memory, and may be accessed by processor 102 at a designated stage of boot operations, as will be discussed in greater detail below.

Figure 2:
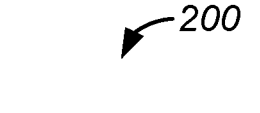
FIG. 2 illustrates an example of a system for boot operations, configured in accordance with some embodiments.
Figure 2:
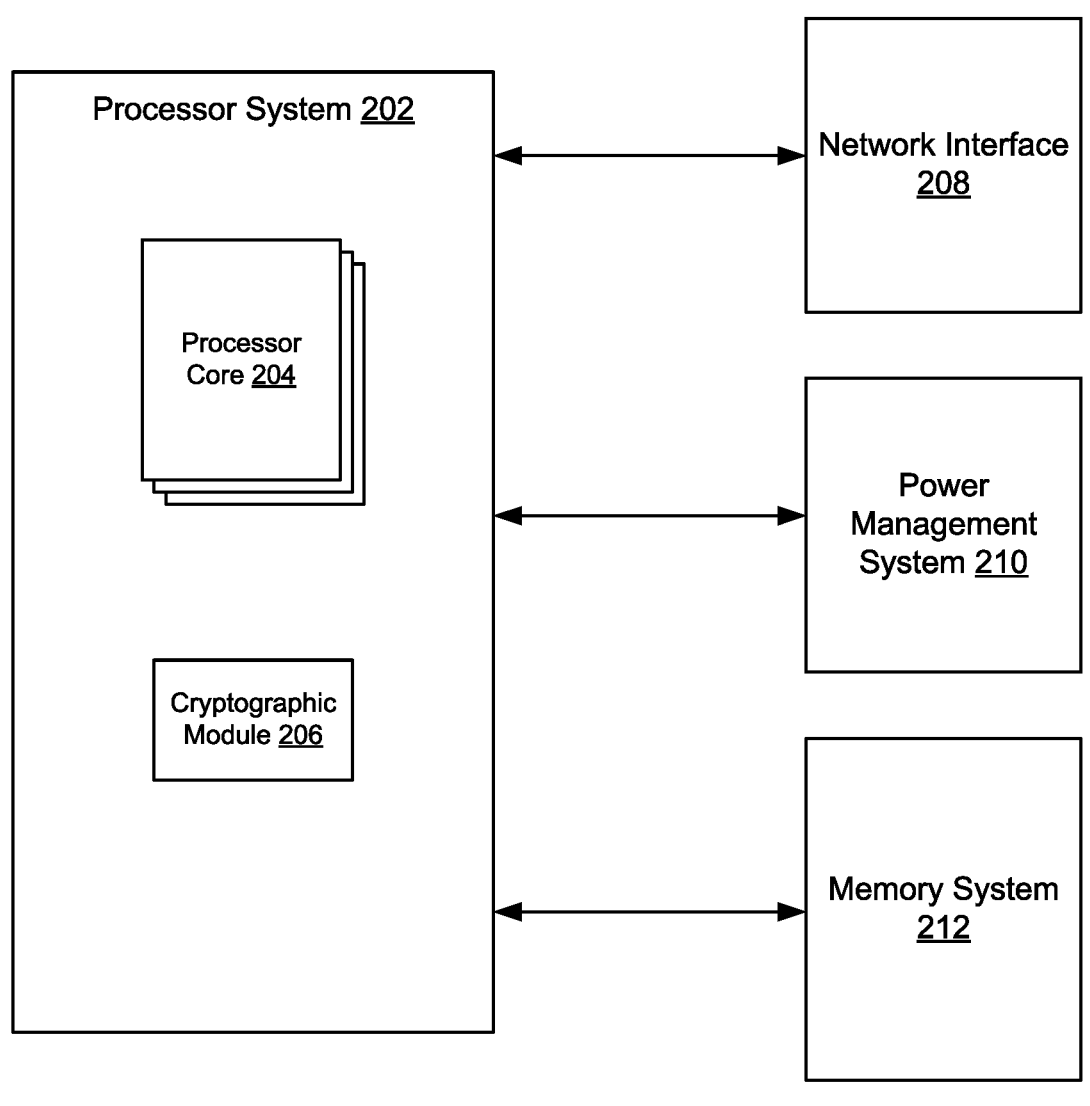

FIG. 2 illustrates an example of a system for boot operations, configured in accordance with some embodiments. As similarly discussed above, a device, such as device 100, may be configured to have different operational modes, such as a wake mode and a sleep mode. Moreover, electronic components implemented in different power domains may be powered and unpowered in different operational modes, and such powering and depowering of power domains may be controlled, at least in part, using different boot operations in wake mode transitions. As will be discussed in greater detail below with reference to system 200, such control over power domains may be implemented in the context of a power management system that may be used during such boot operations.

System 200 includes processor system 202 that may be configured to perform one or more processing operations for system 200. As similarly discussed above, system 200 may be one of a plurality of different types of systems, such as a wireless communications system or other environmental monitoring or security system, or any other suitable system including components capable of booting upon power-up and/or transitioning from a sleep mode to a wake mode. Accordingly, processor system 202 may include one or more processor cores, such as processor core 204 that may include processing elements configured to perform such processing operations.

In various embodiments, processor system 202 may also include cryptographic module 206 which is configured to perform cryptographic processing operations, as will be discussed in greater detail below. Such cryptographic processing operations may include the encrypting, decrypting and authenticating of data in accordance with one or more cryptographic standards. In some embodiments, cryptographic module 206 may be configured to perform asymmetric cryptographic operations or symmetric cryptographic operations as may be determined based on a boot status of system 200. In various embodiments, cryptographic module 206 may be implemented by processor core 204, or may be implemented as a separate hardware block, such as a hardware accelerator. Thus, according to some embodiments, cryptographic module 206 may have its own dedicated hardware resources. Additional details regarding management and implementation of such cryptographic operations are discussed in greater detail below with reference to FIG. 3-FIG. 6.

System 200 additionally includes memory system 212 which is configured to store one or more data values for processing operations performed by processor system 202. As similarly discussed above, memory system 212 may include a volatile memory that may include a retention memory portion as well as a non-retention memory portion. Memory system 212 may also include an internal non-volatile memory and an external non-volatile memory. Accordingly, memory system 212 may include various different memory modules that are configured to implement secure and non-secure portions of memory that may be utilized based on types of boot operations being performed, as will be discussed in greater detail below.

In some embodiments, system 200 further includes network interface 208 that is configured to provide communication with one or more external devices and/or systems. Accordingly, network interface 208 may be configured to be compatible with any suitable network protocol and to facilitate communication with such external devices and/or systems.

System 200 may also include power management system 210 which may include one or more power supplies configured to provide power to power domains of system 200. In some embodiments, power management system 210 may also be configured to receive inputs to detect and identify power on and power off events. Accordingly, power management system 210 may be configured to receive an input from, for example, a user, that may identify when system 200 should be depowered or transition to a sleep mode, as well as when system 200 should be powered on or transitioned to a wake mode. It will be appreciated that such inputs may be received via other input devices, such as one or more buttons included in system 200, and such inputs may be received at processor system 202 directly via such input devices. Moreover, as will be discussed in greater detail below, such inputs may be received and/or detected as system events, such as inputs received from one or more sensors, a timer, or other operational condition of system 200.

Figure 3:
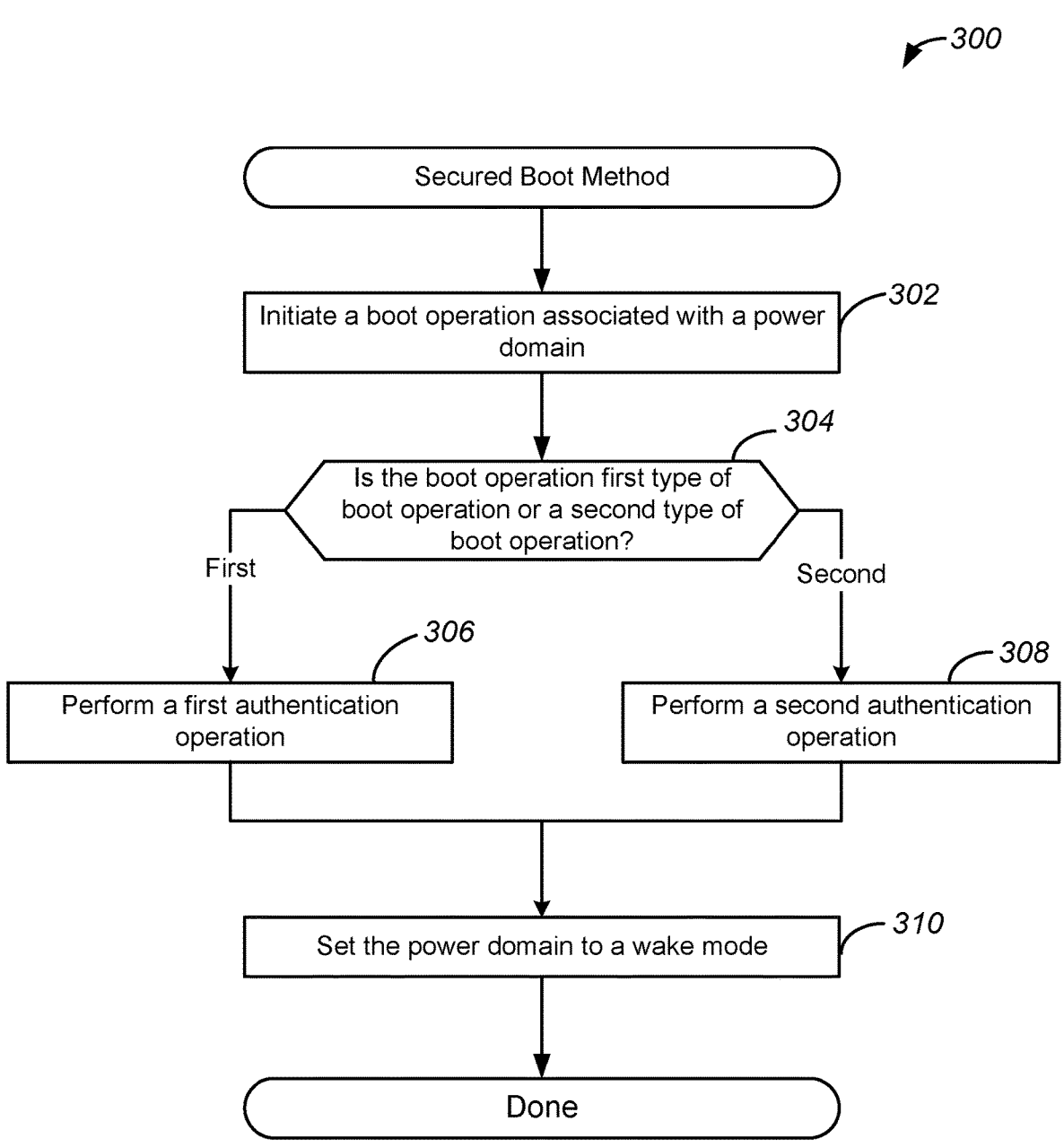
FIG. 3 illustrates an example of a method for boot operations, performed in accordance with some embodiments.

FIG. 3 illustrates an example of a method for boot operations, performed in accordance with some embodiments. Accordingly, a method, such as method 300, may be performed to manage boot operations performed for different power domains such that overall power consumption and processing time associated with such boot operations are reduced. As will be discussed in greater detail below, different authentication operations may be performed based on a boot status thus enabling more efficient authentication operations to be used during such boot operations when appropriate.

Method 300 may perform operation 302 during which a boot operation may be initiated for a power domain. In various embodiments, the boot operation may be initiated in response to receiving an input, as similarly discussed above. More specifically, a system input may identify a power-on event in which an entity, such as a user, has indicated that the power domain should be transitioned to an active state, such as a powered-on wake mode. In various embodiments, the system input may also be generated based on other entities, such as a timer configured to periodically identify a power event, or a sensor configured to identify a power event in response to one or more operational conditions and/or system events, such as an input received from an accelerometer.

Method 300 may perform operation 304 during which it may be determined if the boot operation is a first type of boot operation or a second type of boot operation. In various embodiments, such a determination may be made based, at least in part, on a transition from a previous state, as may be defined by firmware. For example, if all power domains within a system or device are depowered, the boot operation may be the first type of boot operation, which may be a cold boot. Moreover, if one or more power domains are depowered, while one or more other power domains are powered, as may be the case with a sleep mode in which retention memory remains powered, the boot operation may be a second type of boot operation, which may be a warm boot. In this way, current status information may be used to determine a type of boot operation.

If it is determined that the boot operation is a first type of boot operation, method 300 may proceed to operation 306 during which a first authentication operation may be performed. In various embodiments, the first authentication operation is performed after the implementation of a hash function that may be used for data compression. As will be discussed in greater detail below, the first authentication operation may be relatively computationally intensive, and in some embodiments, may utilize additional components of a processor system, such as a cryptographic module.

If, during operation 304, it is determined that the boot operation is a second type of boot operation, method 300 may proceed to operation 308 during which a second authentication operation may be performed. In various embodiments, the second authentication operation is less computationally intensive relative to the first authentication operation and is also a faster authentication operation. As will be discussed in greater detail below with reference to FIG. 4, the second authentication operation may be configured such that it may be less computationally intensive, and thus result in reduced processing times.

Method 300 may perform operation 310 during which the power domain may be set to a wake mode. Accordingly, once authentication operations have been completed, one or more power domains may be powered, and the system or device that includes the power domains may be transitioned to an active mode that may also be referred to as a wake mode.

Figure 4:
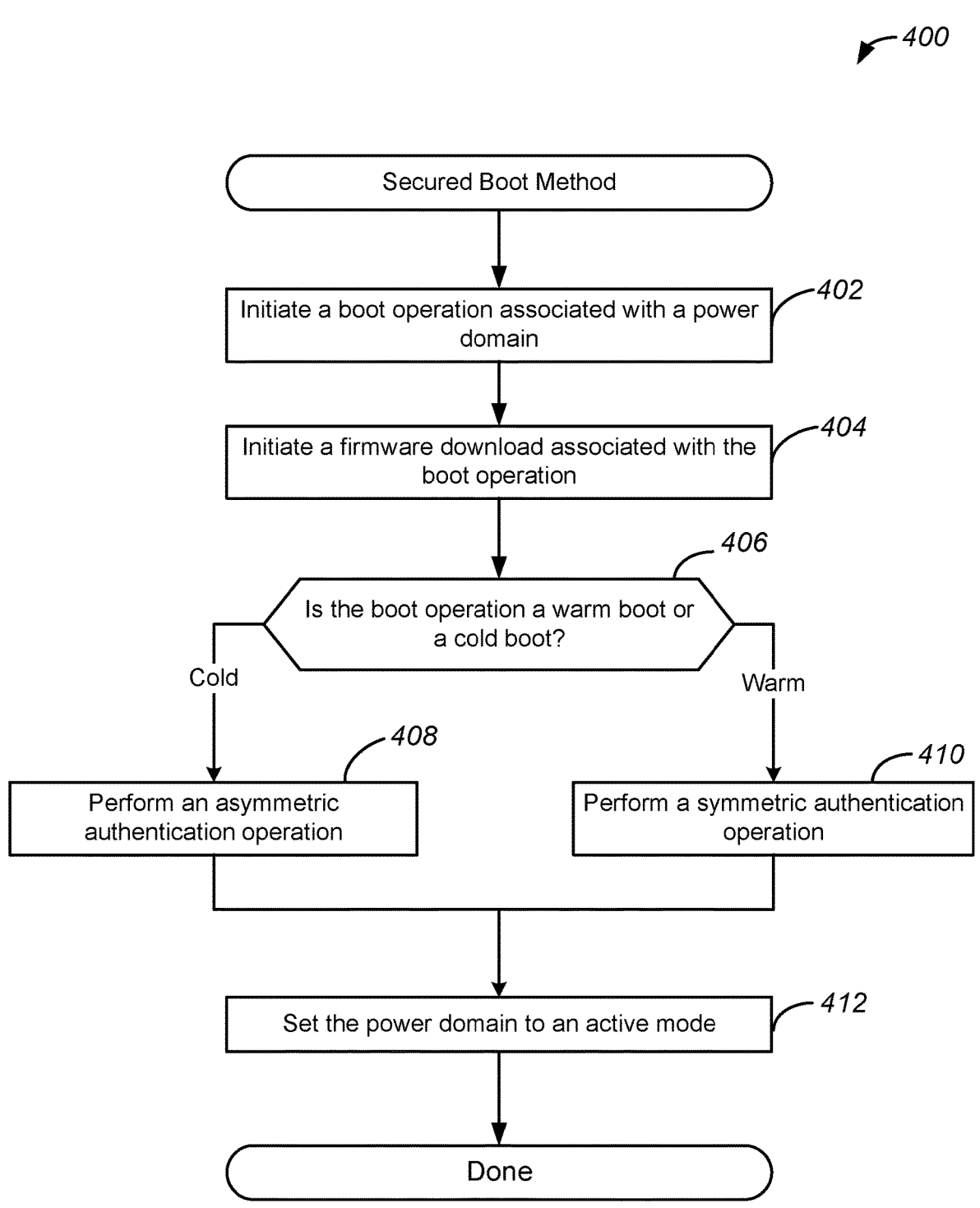
FIG. 4 illustrates an additional example of a method for boot operations, performed in accordance with some embodiments.

FIG. 4 illustrates an additional example of a method for boot operations, performed in accordance with some embodiments. Accordingly, a method, such as method 400, may be performed to manage boot operations performed for different power domains such that overall power consumption and processing time associated with such boot operations are reduced. As will be discussed in greater detail below, different types of authentication operations may be selectively used based on a boot status. More specifically, asymmetric and symmetric cryptographic techniques may be selectively deployed based on boot status to reduce processing overhead associated with such boot operations.

Method 400 may perform operation 402 during which a boot operation may be initiated for a power domain. As similarly discussed above, systems and devices disclosed herein may have different power domains associated with different power modes, and such power domains may be powered and depowered collectively or independently based on types of transitions between such power modes. In some embodiments, a boot operation may be initiated in response to receiving an input, as similarly discussed above. More specifically, a system input may identify a power-on event in which an entity, such as a user, has indicated that the power domain should be transitioned to an active state, such as a powered on wake mode.

Method 400 may perform operation 404 during which a firmware download may be initiated. In various embodiments, the firmware may be stored in a non-secure memory location. Accordingly, a non-secure portion of memory may be accessed, and the firmware may be downloaded.

Method 400 may perform operation 406 during which it may be determined if the boot operation is a warm boot or a cold boot. As similarly discussed above, such a determination may be made based, at least in part, on a transition from a previous state, as may be defined by the firmware. For example, if all power domains within a system or device are depowered, the boot operation may be a cold boot. Moreover, if one or more power domains are depowered, while one or more other power domains are powered, as may be the case with a sleep mode in which retention memory remains powered, the boot operation may be a warm boot. In this way, current status information may be used to determine a type of boot operation. In various embodiments, such status information may be stored in retention memory.

Method 400 may perform operation 408 during which an asymmetric authentication operation may be performed. In various embodiments, the asymmetric authentication operation uses an asymmetric cryptographic key pair, such as a public/private key pair. In this example, the public key may be stored in non-secure memory, thus being available to the system during boot operations. In some embodiments, a hash function may also be used as a compression function applied to data being used by the asymmetric cryptographic algorithm. Accordingly, a system or device may include a public key, and use the public key to authenticate contents of firmware stored in the secure memory during the asymmetric authentication operation. As discussed above, such asymmetric authentication operations may be performed by components of a processor system, such as a cryptographic module.

If, during operation 406, it is determined that the boot operation is a warm boot, method 400 may proceed to operation 410 during which a symmetric authentication operation may be performed. As disclosed herein, a symmetric authentication operation may be an authentication operation performed based on symmetric key cryptography. In various embodiments, the symmetric authentication operation uses a symmetric algorithm, such as CBC-MAC, HMAC, or Poly1035. When performed in this way, authentication may be less computationally intensive, and may also result in faster processing times. As will be discussed in greater detail below with reference to FIG. 5 and FIG. 6, the unique key used for the symmetric key based authentication may have been previously generated as part of a previous transition to a sleep mode.

Method 400 may perform operation 412 during which the power domain may be set to a wake mode. Accordingly, once authentication operations have been completed, one or more power domains may be powered, and the system or device that includes the power domains may be transitioned to an active mode that may also be referred to as a wake mode. If the boot operation was a cold boot, all power domains may be powered up. If the boot operation was a warm boot, the power domains that were depowered may be powered up.

Figure 5:
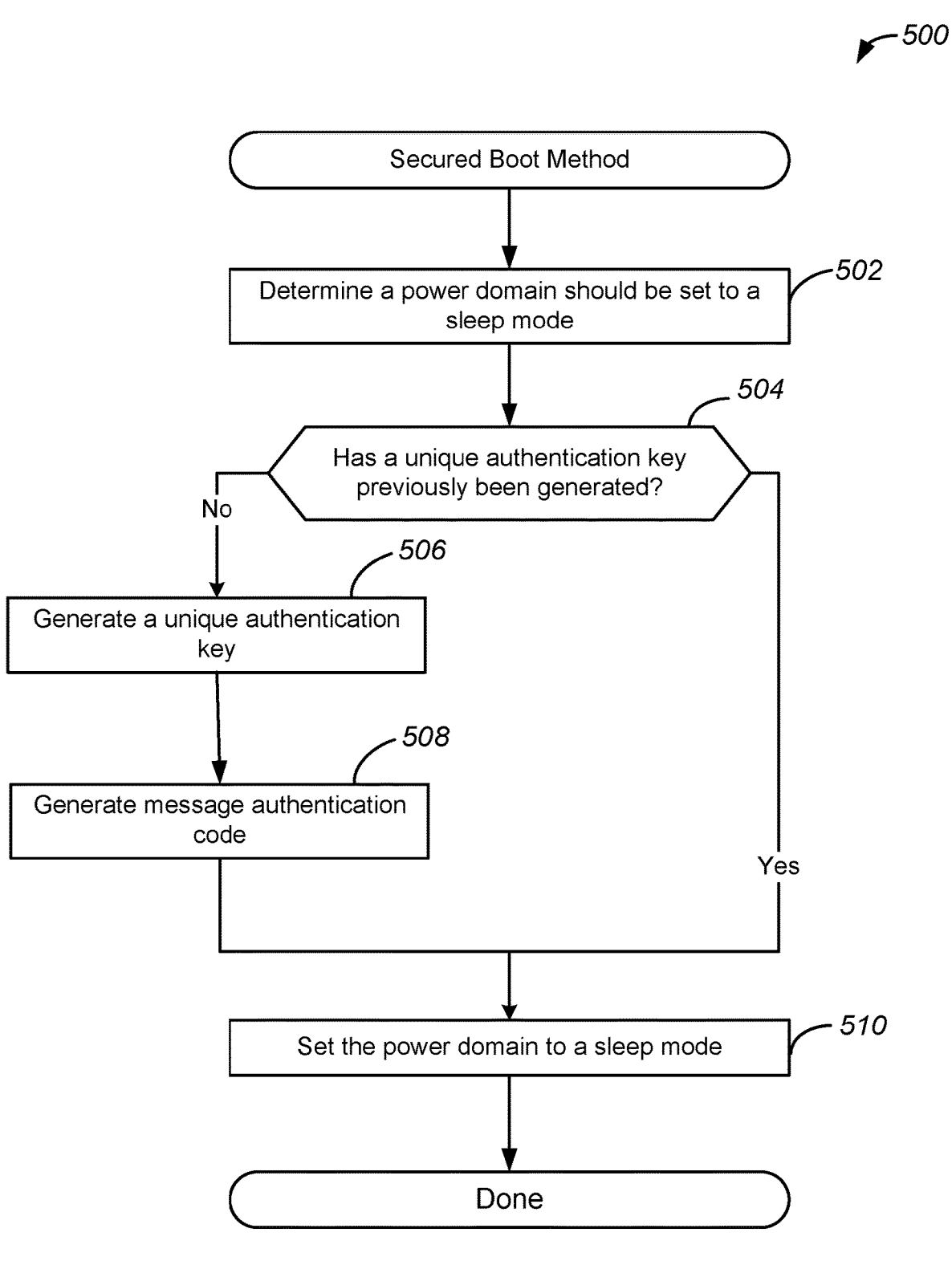
FIG. 5 illustrates an example of a method for authentication key generation, performed in accordance with some embodiments.

FIG. 5 illustrates an example of a method for authentication key generation, performed in accordance with some embodiments. Accordingly, a method, such as method 500, may be performed to manage generation of unique cryptographic keys that may be used during boot operations performed for different power domains. As similarly discussed above, different types of authentication operations may be selectively used based on a boot status, and such authentication operation may include symmetric cryptographic techniques that reduce processing overhead associated with such boot operations.

Method 500 may perform operation 502 during which it may be determined that a power domain should be set to a sleep mode. As similarly discussed above, such a determination may be made based on an input received at a power management system or other input device. In one example, the determination may be made based on a user input indicating that a system or device that includes the power domain should be set to a sleep mode.

Method 500 may perform operation 504 during which it may be determined if a unique authentication key has previously been generated. In various embodiments, such a determination may be made based on a query of a designated storage location. For example, a portion of retention memory may be configured to store unique authentication keys used for boot operations. Accordingly, the designated storage location in the retention memory may be queried to determine if it includes data values. If there is data stored in the designated storage location, it may be determined that a unique authentication key has previously been generated. It will be appreciated that the contents of the designated storage location are erased when the retention memory is depowered, as may be the case when the system or device is completely turned off and not just set to a sleep mode. In various embodiments, such a determination may be made based on status information such as whether or not a transition to a sleep mode is a first sleep transition after a cold boot. In some embodiments, a unique authentication key may be generated every time a sleep mode is entered.

In some embodiments, if it is determined that a unique authentication key has previously been generated, method 500 may proceed to operation 508 discussed in greater detail below. However, if it is determined that no unique authentication key has previously been generated, method 500 may perform operation 506 during which a new unique authentication key may be generated. In various embodiments, a symmetric key may be generated and stored in a secure portion of retention memory. As similarly discussed above, the symmetric key may be generated using a random number generator.

Method 500 may perform operation 508 during which message authentication code may be generated. In various embodiments, the message authentication code may be generated based on a symmetric key based authentication algorithm, and is configured to store a result of an authentication computation. In various embodiments, the message authentication code is stored in the secure portion of retention memory with the symmetric key discussed above with reference to operation 506. Accordingly, upon a subsequent boot operation in a warm boot operation, a stored key may be used to generate a message authentication code based on downloaded firmware, and the message authentication code generated during boot may be compared against the message authentication code stored in memory to authenticate the firmware.

Method 500 may perform operation 510 during which the power domain may be set to a sleep mode. Accordingly, one or more power domains may be depowered in accordance with a power scheme defined by the sleep mode, and the system or device that includes the power domains may be transitioned to a sleep mode. In one example, a first power domain that includes the retention memory may remain powered while a second power domain that includes the processor may be depowered.

Figure 6:
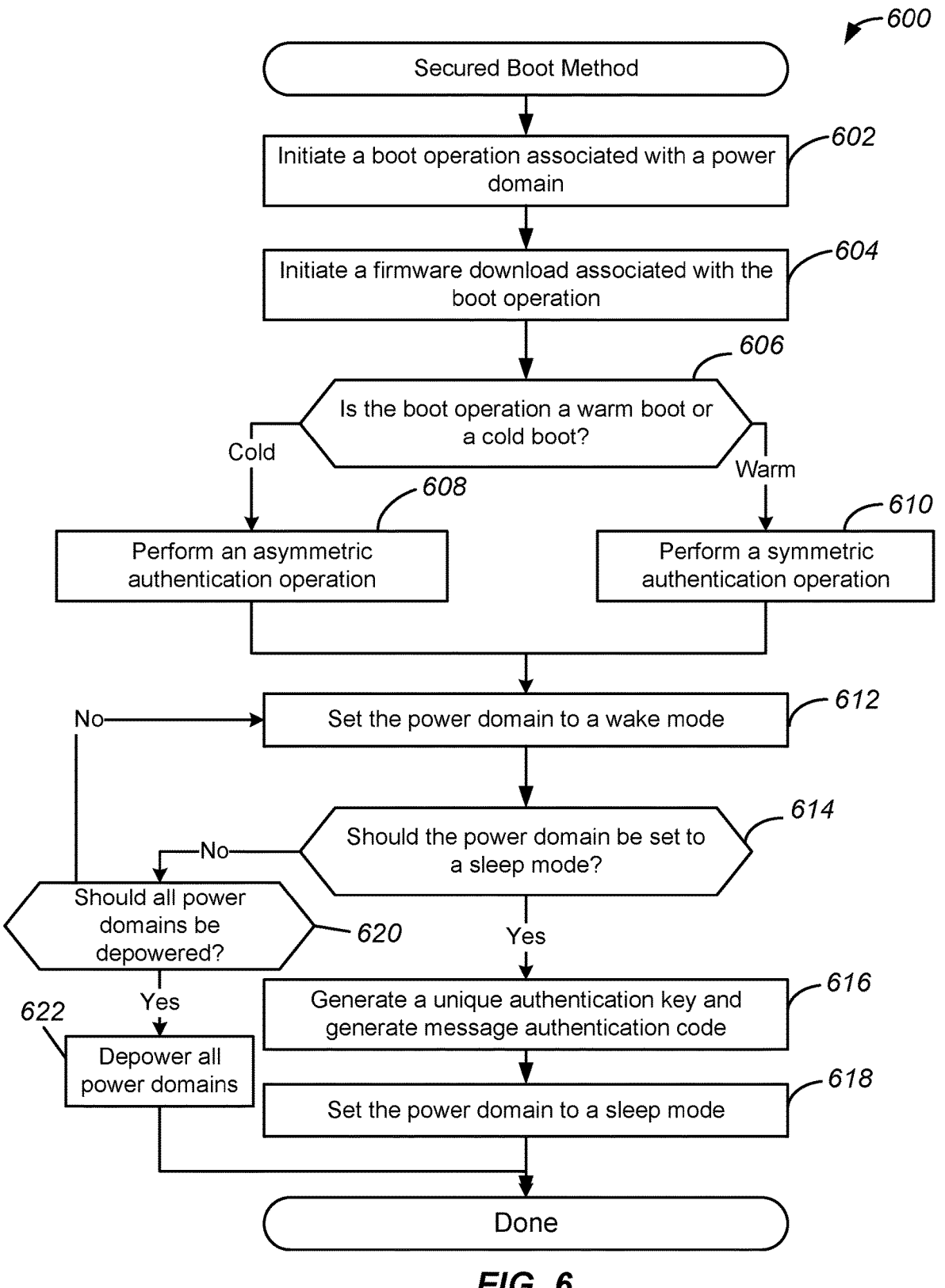
FIG. 6 illustrates another example of a method for boot operations, performed in accordance with some embodiments.

FIG. 6 illustrates another example of a method for boot operations, performed in accordance with some embodiments. Accordingly, a method, such as method 600, may be performed to manage boot operations for different power domains such that overall power consumption and processing time associated with such boot operations are reduced. As similarly discussed above, different types of authentication operations may be selectively used based on a boot status. As will be discussed in greater detail below, a unique authentication key may be generated each time a power domain is set to a sleep mode, thus improving overall security.

Method 600 may perform operation 602 during which a boot operation may be initiated for a power domain. As similarly discussed above, systems and devices disclosed herein may have different power domains associated with different power modes, and such power domains may be powered and depowered collectively or independently based on types of transitions between such power modes. Such boot operations may be initiated in response to receiving an input. More specifically, a system input may identify a power-on event in which an entity, such as a user, has indicated that the power domain should be transitioned to an active state, such as a powered on wake mode. As discussed above, the system input may also be identified based on one or more system events and/or operational conditions.

Method 600 may perform operation 604 during which a firmware download may be initiated. In various embodiments, the firmware may be stored in a non-secure memory location. Accordingly, the non-secure memory may be accessed, and the firmware may be downloaded from the non-secure memory.

Method 600 may perform operation 606 during which it may be determined if the boot operation is a warm boot or a cold boot. As similarly discussed above, such a determination may be made based, at least in part, on a transition from a previous state, as may be defined by the firmware. For example, if all power domains within a system or device are depowered, the boot operation may be a cold boot. Moreover, if one or more power domains are depowered, while one or more other power domains are powered, as may be the case with a sleep mode in which retention memory remains powered, the boot operation may be a warm boot. In this way, current status information may be used to determine a type of boot operation.

Method 600 may perform operation 608 during which an asymmetric authentication operation may be performed. As similarly discussed above, the asymmetric authentication operation uses an asymmetric cryptographic key pair, such as a public/private key pair. Moreover, a hash function may also be used as a compression function applied to data being used by the asymmetric cryptographic algorithm. Accordingly, a system or device may include a public key, and use the public key to authenticate contents of firmware stored in the secure memory during the asymmetric authentication operation.

If, during operation 606, it is determined that the boot operation is a warm boot, method 600 may proceed to operation 610 during which a symmetric authentication operation may be performed. In various embodiments, the symmetric authentication operation uses a symmetric algorithm, such as CBC-MAC, HMAC, or Poly1035. Accordingly, authentication may be less computationally intensive and result in faster processing times. In various embodiments, a unique authentication key used for symmetric key based authentication may be stored in secure memory and may be retrieved during operation 606. As will be discussed in greater detail below, such a unique authentication key may have been generated during a previous sleep mode transition.

Method 600 may perform operation 612 during which the power domain may be set to a wake mode. Accordingly, once authentication operations have been completed, one or more power domains may be powered, and the system or device that includes the power domains may be transitioned to an active mode that may also be referred to as a wake mode. If the boot operation was a cold boot, all power domains may be powered up. If the boot operation was a warm boot, the power domains that were depowered may be powered up.

Method 600 may perform operation 614 during which it may be determined if one or more power domains should be set to a sleep mode. In various embodiments, such a determination may be made in response to a system input. As similarly discussed above, an input may be received at the system or device that includes the power domains, and such an input may be received from a user. For example, the user may provide an input at a power button or other input device that indicates one or more power domains should be depowered. During operation 614, such an input may be received and used to identify which target operational mode has been identified. In some embodiments, such a determination may be made based on the occurrence of one or more system events, such as a power domain remaining powered for a designated period of time and also being inactive for the designated period of time.

Accordingly, if it is determined that one or more power domains should be set to a sleep mode, method 600 may perform operation 616 during which a new unique authentication key may be generated. As similarly discussed above, such a unique authentication key may be generated using a random number generation technique. In various embodiments, a symmetric key pair may be generated and stored in retention memory. In this way, a new unique authentication key may be generated in response to determining that a system or device should enter a sleep mode, and prior to the sleep mode transition. As also discussed above, the new unique key may be generated every time a sleep mode is entered, or may be generated periodically based on a designated time interval.

In various embodiments, during operation 616, a message authentication code may also be generated. As similarly discussed above, the message authentication code may be generated based on a symmetric key based authentication algorithm, and is configured to store a result of an authentication computation. In various embodiments, the message authentication code is stored in the secure portion of retention memory with the symmetric key. Accordingly, upon a subsequent boot operation in a warm boot operation, a stored key may be used to generate a message authentication code based on downloaded firmware, and the message authentication code generated during boot may be compared against the message authentication code stored in memory to authenticate the firmware.

Method 600 may perform operation 618 during which the power domain may be set to a sleep mode. Accordingly, one or more power domains may be depowered in accordance with a power scheme defined by the sleep mode, and the system or device that includes the power domains may be transitioned to a sleep mode. In one example, a first power domain that includes the retention memory may remain powered while a second power domain that includes the processor may be depowered.

If, at operation 614, it is determined that one or more power domains should not be set to a sleep mode, method 600 may proceed to operation 620 during which it may be determined if all power domains should be depowered. In various embodiments, such a determination may be made based on the received input that may identify, for example, that a system or device should not be put to sleep, but instead be turned off entirely. Accordingly, if it is not determined that all power domains should be depowered, method 600 may return to operation 612. However, if it is determined that all power domains should be depowered, method 600 may proceed to operation 622 where all power domains may be depowered, and a system or device that includes the power domains may be turned off. It will be appreciated that once turned off, the next boot operation will be a cold boot operation that uses an asymmetric authentication operation, and any unique authentication key stored in retention memory will be erased by the depowering.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   initiating, using one or more processing elements, a boot operation associated with a plurality of power domains;
   determining, using the one or more processing elements, a type of the boot operation based, at least in part, on current status information identifying a current status of each of the plurality of power domains;
   determining, using the one or more processing elements, which authentication operations to perform based, at least in part, on the type of boot operation and a configuration of the plurality of power domains being booted, the determining of which authentication operations to perform comprising determining whether an asymmetric authentication operation is performed; and performing, using the one or more processing elements, the authentication operations prior to booting the power domain.

2. The method of claim 1, wherein the type of boot operation is a warm boot operation or a cold boot operation.

3. The method of claim 2, wherein the warm boot operation comprises powering at least some of the plurality of power domains, and wherein the cold boot operation comprises powering all of the plurality of power domains.

4. The method of claim 2, wherein the authentication operations comprise an asymmetric authentication operation or a symmetric authentication operation.

5. The method of claim 4, wherein the asymmetric authentication operation is performed for a cold boot operation, and wherein the symmetric authentication operation is performed for the warm boot operation.

6. The method of claim 5, wherein the asymmetric authentication operation takes a longer period of time than the symmetric authentication operation.

7. The method of claim 1 further comprising:

determining the plurality of power domains should be transitioned to a sleep mode; and generating a unique authentication key.

8. The method of claim 7, wherein the unique authentication key is a symmetric authentication key.

9. The method of claim 7 further comprising:

storing the unique authentication key in a retention memory.

10. A system comprising:

a nonvolatile memory comprising a retention memory storage location; and a processing device configured to:

initiate a boot operation associated with a plurality of power domains;

determine a type of the boot operation based, at least in part, on current status information identifying a current status of each of the plurality of power domains;

determine which authentication operations to perform based, at least in part, on the type of boot operation and a configuration of the plurality of power domains being booted, the determining of which authentication operations to perform comprising determining whether an asymmetric authentication operation is performed; and perform the authentication operations prior to booting the power domain.

11. The system of claim 10, wherein the type of boot operation is a warm boot operation or a cold boot operation, wherein the warm boot operation comprises powering at least some of the plurality of power domains, and wherein the cold boot operation comprises powering all of the plurality of power domains.

12. The system of claim 11, wherein the authentication operations comprise an asymmetric authentication operation or a symmetric authentication operation, wherein the asymmetric authentication operation is performed for a cold boot operation, and wherein the symmetric authentication operation is performed for the warm boot operation.

13. The system of claim 12, wherein the asymmetric authentication takes a longer period of time than the symmetric authentication operation.

14. The system of claim 10, wherein the processing device is further configured to:

determine the plurality of power domains should be transitioned to a sleep mode; and generate a unique authentication key.

15. The system of claim 14, wherein the unique authentication key is a symmetric authentication key, and wherein the unique authentication key is stored in the retention memory storage location.

16. A device comprising:

one or more processing elements configured to:

initiate a boot operation associated with a plurality of power domains;

determine a type of the boot operation based, at least in part, on current status information identifying a current status of each of the plurality of power domains;

determine which authentication operations to perform based, at least in part, on the type of boot operation and a configuration of the plurality of power domains being booted, the determining of which authentication operations to perform comprising determining whether an asymmetric authentication operation is performed; and perform the one or more authentication operations prior to booting the power domain.

17. The device of claim 16, wherein the type of boot operation is a warm boot operation or a cold boot operation, wherein the warm boot operation comprises powering at least some of the plurality of power domains, and wherein the cold boot operation comprises powering all of the plurality of power domains.

18. The device of claim 17, wherein the authentication operations comprise an asymmetric authentication operation or a symmetric authentication operation, wherein the asymmetric authentication operation is performed for a cold boot operation, and wherein the symmetric authentication operation is performed for the warm boot operation.

19. The device of claim 16 wherein the one or more processing elements are further configured to:

determine the plurality of power domains should be transitioned to a sleep mode; and generate a unique authentication key.

20. The device of claim 19, wherein the unique authentication key is a symmetric authentication key, and wherein the unique authentication key is stored in a retention memory storage location.

* * * * *